United States Patent
Ernst et al.

(10) Patent No.: US 11,330,147 B2
(45) Date of Patent: May 10, 2022

(54) PRINTER INTRUSION DETECTION

(71) Applicants: Larry M Ernst, Longmont, CO (US); Mike Munson, Boulder, CO (US)

(72) Inventors: Larry M Ernst, Longmont, CO (US); Mike Munson, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/719,572

(22) Filed: Dec. 18, 2019

(65) Prior Publication Data
US 2021/0195063 A1    Jun. 24, 2021

(51) Int. Cl.
*H04N 1/44* (2006.01)
*G06K 9/00* (2006.01)
*H04N 1/00* (2006.01)
*G07C 9/00* (2020.01)

(52) U.S. Cl.
CPC ....... *H04N 1/4433* (2013.01); *G06K 9/00288* (2013.01); *G07C 9/00571* (2013.01); *H04N 1/0048* (2013.01); *H04N 1/00543* (2013.01)

(58) Field of Classification Search
CPC ............. H04N 1/4433; H04N 1/00543; H04N 1/0048; G07C 9/00571; G06K 9/00288
USPC ....................................................... 358/1.14
See application file for complete search history.

(56) References Cited

U.S. PATENT DOCUMENTS

| | | | |
|---|---|---|---|
| 7,761,923 B2 | 7/2010 | Khuti et al. | |
| 8,199,009 B2 | 6/2012 | Brunetti | |
| 8,963,715 B2 | 2/2015 | Bertoni et al. | |
| 9,111,088 B2 | 8/2015 | Ghai et al. | |
| 10,331,473 B2 | 6/2019 | Nenov | |
| 2005/0040226 A1 | 2/2005 | Al-Sheikh | |
| 2005/0055568 A1 | 3/2005 | Agrawala et al. | |
| 2006/0066891 A1* | 3/2006 | Ikeda | G06F 3/1222 358/1.15 |
| 2009/0220255 A1* | 9/2009 | Futamata | G03G 15/5016 399/31 |
| 2009/0295534 A1 | 12/2009 | Golander et al. | |
| 2015/0212468 A1* | 7/2015 | Adachi | G03G 15/5091 399/80 |

(Continued)

OTHER PUBLICATIONS

Kristine Frank et al; Combining Logical and Physical Access Control for Smart Environments; Technical University of Denmark; Aug. 2004.

(Continued)

*Primary Examiner* — Iriana Cruz
(74) *Attorney, Agent, or Firm* — Duft & Bornsen, PC

(57) ABSTRACT

System and method for printer intrusion detection. One embodiment is a system that includes memory configured to store personnel identification data for a plurality of operator classes permitted to perform different levels of maintenance actions on a printer. The system also includes an intrusion detection controller configured to detect a presence of a person in an operating space of the printer based on image data, to analyze the image data to detect one or more characteristics of the person, to determine an operator class for the person based on a match of the detected characteristics of the person with the personnel identification data stored in the memory, and to monitor adherence to maintenance permissions by the person in a plurality of physical areas of the printer based on the operator class of the person.

20 Claims, 12 Drawing Sheets

(56) References Cited

U.S. PATENT DOCUMENTS

| | | |
|---|---|---|
| 2018/0103049 A1 | 4/2018 | Garry |
| 2018/0275576 A1* | 9/2018 | Maruyama ........... G03G 15/205 |
| 2019/0035244 A1 | 1/2019 | Garg et al. |
| 2019/0180539 A1 | 6/2019 | Alkhabbaz et al. |
| 2019/0219976 A1* | 7/2019 | Giorgi .................. H04L 63/105 |

OTHER PUBLICATIONS

Scott Buss et al; RFID for Safety in Materials Handling; Kimberly-Clark Corporation.

* cited by examiner

PRINTER INTRUSION DETECTION

TECHNICAL FIELD

The invention relates to the field of printing systems and, in particular, to printers capable of detecting potential intrusion.

BACKGROUND

Entities with substantial printing demands often use a production printer that prints on a web of print media at high-speed (e.g., one hundred pages per minute or more). A production printer typically includes a print controller that controls the overall operation of the printing system, and a print engine that physically marks the web. The print engine has an array of printheads and each individual printhead includes multiple tiny nozzles (e.g., 360 nozzles per printhead depending on resolution) that are operable to discharge ink as controlled by the printhead controller. Due to the complex arrangement of components inside a production printer, there are numerous different types of maintenance procedures and agents (personnel and/or objects) to potentially change the physical operation of the printer and/or impact the physical security of the printer.

SUMMARY

Embodiments described herein provide for printer intrusion detection. The printer implements detection of several levels of operator classes, and determines whether a person in proximity of the printer is allowed to perform certain actions on the printer based on their operator class. This improves safety in the area of the printer and prevents potential instances of printer damage and degraded printer performance.

In one embodiment, a system that includes memory configured to store personnel identification data for a plurality of operator classes permitted to perform different levels of maintenance actions on a printer. The system also includes an intrusion detection controller configured to detect a presence of a person in an operating space of the printer based on image data, to analyze the image data to detect one or more characteristics of the person, to determine an operator class for the person based on a match of the detected characteristics of the person with the personnel identification data stored in the memory, and to monitor adherence to maintenance permissions by the person in a plurality of physical areas of the printer based on the operator class of the person.

Another embodiment is a method that includes storing, in memory, personnel identification data for a plurality of operator classes permitted to perform different levels of maintenance actions on a printer, detecting a presence of a person in an operating space of the printer, analyzing an image of the person to detect one or more characteristics of the person, determining an operator class for the person based on a match of the detected characteristics of the person with the personnel identification data stored in the memory, and monitoring adherence to maintenance permissions by the person in a plurality of physical areas of the printer based on the operator class of the person.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF THE EMBODIMENTS

The figures and the following description illustrate specific illustrative embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
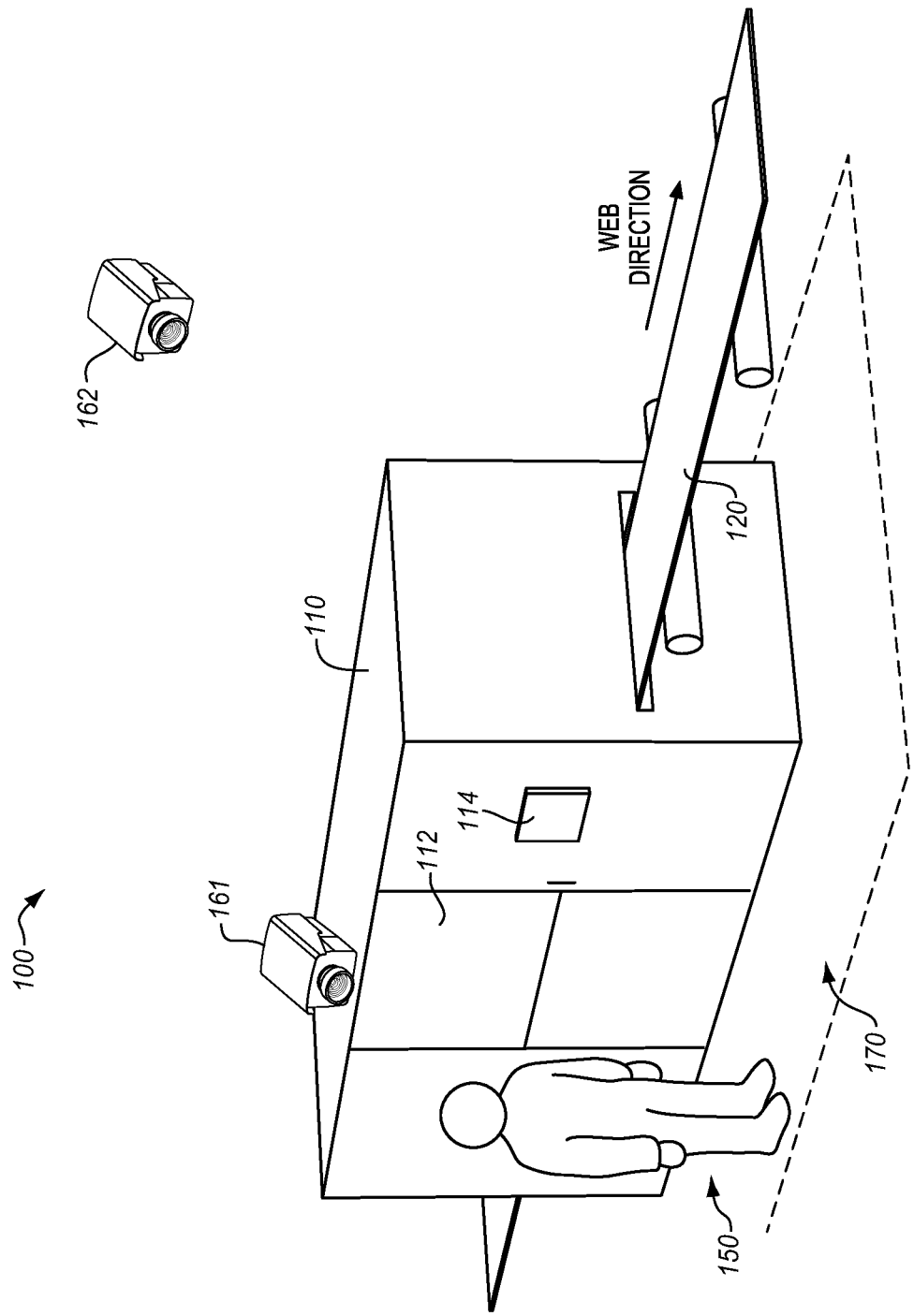
FIG. 1 shows a print system in an illustrative embodiment.

FIG. 1 shows a print system 100 in an illustrative embodiment. The print system 100 includes a printer 110 that applies marks to a print medium 120. The applied marking material may comprise ink in the form of any suitable fluid (e.g., aqueous inks, oil-based paints, additive manufacturing materials, etc.) or other suitable non-fluid marking materials (e.g., toner or additive manufacturing materials, etc.) for marking the print medium 120. As shown in this example, the printer 110 may comprise a continuous-form inkjet printer that prints on a web of continuous-form media, such as paper. However, embodiments described herein may apply to alternative print systems such as cut-sheet printers, wide format printers, 3D printers, electrophotographic printers, etc. The print medium 120 may comprise paper, plastic, textile or any other suitable substrate. The print system 100 may not be limited to printers and may include other types of equipment such as vehicles, computers, manufacturing machines, etc.

A human operator 150 (e.g., machine operator, machine maintenance personnel, etc.) may need to perform a function or action on the printer 110. For example, the human operator 150 may open a cover 112 of the printer 110 to replace, fix, and/or adjust components inside the printer 110. The human operator 150 may also interact with a Graphical User Interface (GUI) 114 of the printer 110 to view and/or manipulate the status or settings of the printer 110.

The printer 110 is enhanced to use one or more cameras 161-162 to determine whether the human operator 150 is authorized to perform certain actions on the printer 110. The cameras 161-162 provide a field of view of an operating space 170 around the printer 110. For example, one or more first camera(s) 161 may be mounted to the printer 110, and one or more second camera(s) 162 may be mounted elsewhere in the room such as a ceiling above the printer 110.

Figure 2:
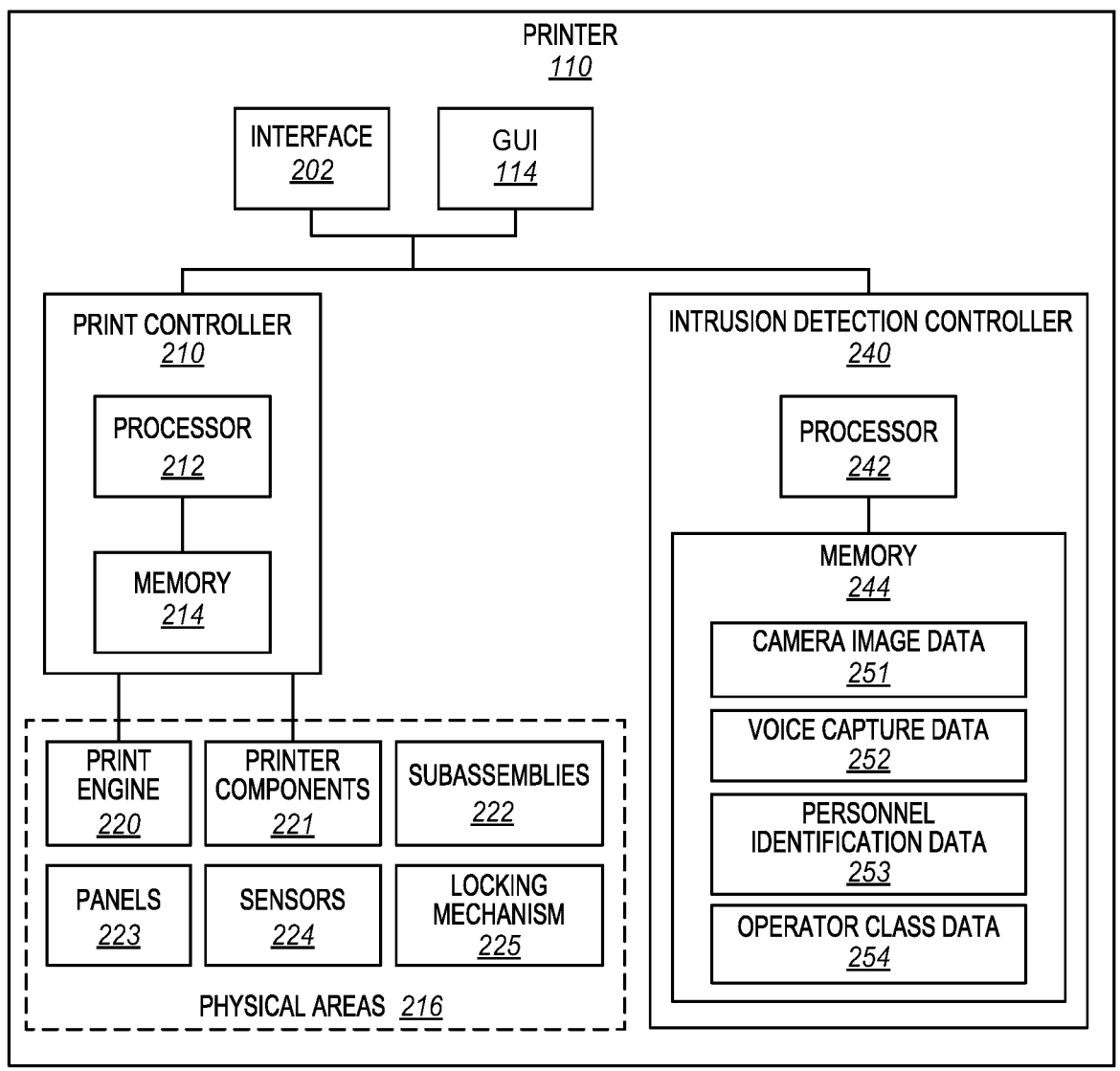
FIG. 2 is a block diagram of a printer in an illustrative embodiment.

FIG. 2 is a block diagram of the printer 110 in an illustrative embodiment. The printer 110 includes an interface 202 (e.g., wireless interface) to exchange data over a network (e.g., wireless LAN) such as image data obtained by the cameras 161-162. The printer 110 also includes a print controller 210 and physical areas 216 of the printer 110 including, for example, a print engine 220, printer components 221, subassemblies 222, panels 223, sensors 224, and a locking mechanism 225.

The print controller 210 is configured to rasterize print jobs into bitmap data. The print controller 210 may be implemented by a processor 212 coupled with memory 214. The print engine 220 receives the rasterized pages and marks physical sheets of media. The printer components 221 may include any mechanical or electrical components installed in the printer 110. The subassemblies 222 include groups of the printer components 221 that perform a collective function of the printer 110. The panels 223 include housing or covers that protect and/or restrict access to one or more printer components 221 or subassemblies 222. The sensors 224 include any system or device configured to detect that one of the panels 223, printer components 221, or subassemblies 222 is being accessed (e.g., touched, opened, removed) by a person. The locking mechanism 225 is any system or device configured to lock and unlock the panels 223 to control access to one or more the physical areas 216 (e.g., printer components 221 and/or subassemblies 222) of the printer 110.

The printer 110 is enhanced with an intrusion detection controller 240 that is configured to detect which operator class the human operator 150 belongs to and monitor their adherence to maintenance permissions performed on the printer 110 based on their operator class. In particular, the intrusion detection controller 240 receives, for storage in memory 244, camera image data 251 and/or voice capture data 252 from the cameras 161-162. The intrusion detection controller 240 also stores personnel identification data 253 and operator class data 254 to be able to recognize the human operator 150 as belonging to a particular operator class and determine the corresponding level of access allowed for the printer 110.

The intrusion detection controller 240 may be implemented with one or more processors 242 coupled with memory 244. A processor includes any electronic circuits and/or optical circuits that are able to perform functions. For example, a processor may include one or more Central Processing Units (CPU), Graphics Processing units (GPU) microprocessors, Digital Signal Processors (DSPs), Application-Specific Integrated Circuits (ASICs), Programmable Logic Devices (PLD), control circuitry, etc. Some examples of processors include Intel Core processors, Advanced Reduced Instruction Set Computing (RISC) Machines (ARM) processors, etc. Memory includes any hardware device that is able to store data, and may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. It will be appreciated that the particular arrangement, number, and configuration of components and elements described herein with respect to FIG. 2 is an example provided for discussion purposes and that numerous alternatives to such are possible. For example, in some embodiments, the intrusion detection controller 240 may be implemented partially or wholly with the printer 110 or another system (e.g., cloud or other remote system) separate from the printer 110. Illustrative details of the operation of the print system 100 and the intrusion detection controller 240 will be discussed with regard to FIG. 3.

Figure 3:
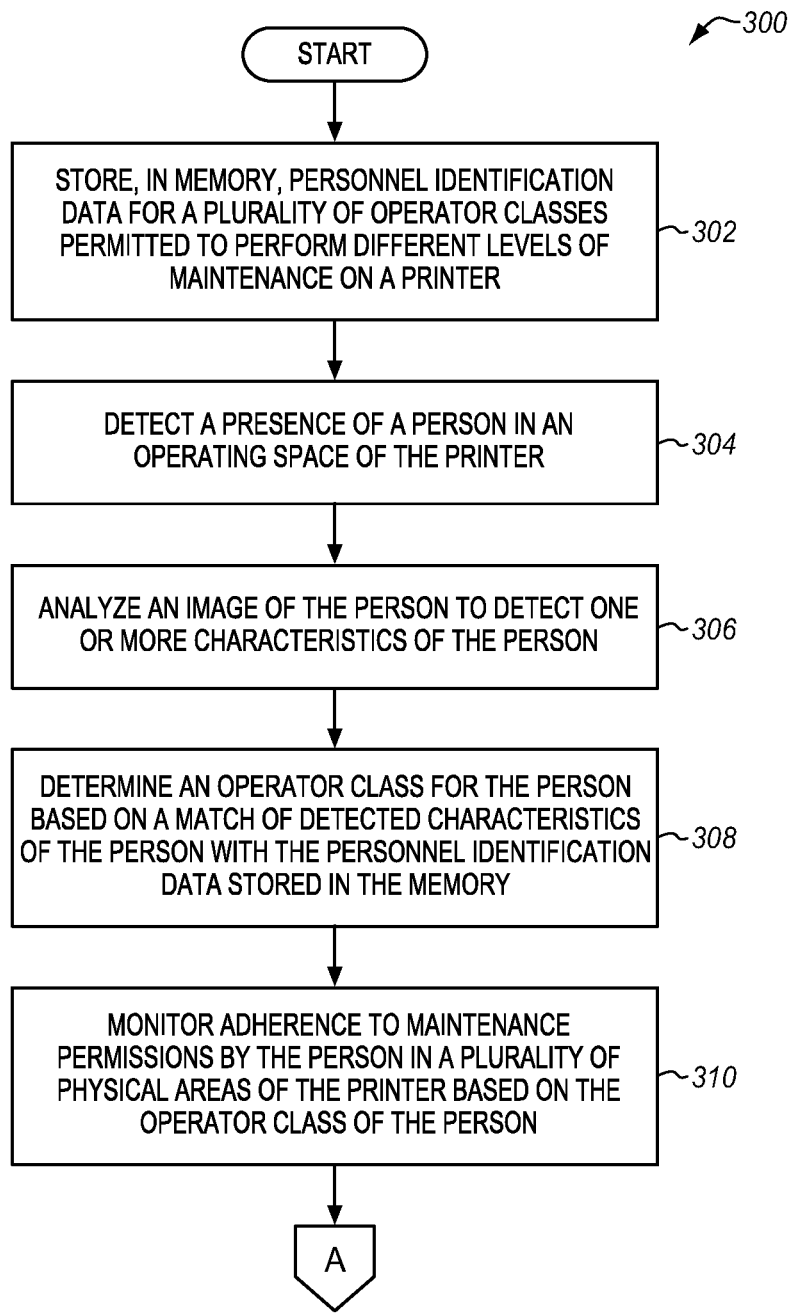
FIG. 3 is a flow chart illustrating a method of detecting intrusion of a printer in an illustrative embodiment.

FIG. 3 is a flow chart illustrating a method 300 of detecting intrusion of a printer in an illustrative embodiment. The steps of method 300 will be described with respect to the printer 110 of FIGS. 1-2, although one skilled in the art will understand that the method 300 may be performed by other systems not shown. The steps of the flow charts described herein are not all inclusive, may include other steps not shown, and may be performed in alternative orders.

In step 302, memory 244 stores the personnel identification data 253 for a plurality of operator classes permitted to perform different levels of maintenance on the printer 110. The personnel identification data 253 may include clothing features (e.g., color, type, badge, etc.) and/or features of an individual's body/face (e.g., hair color, height, eye color, etc.). The personnel identification data 253 may correlate an individual person (e.g., human operator 150), a combination of patterns (e.g., characteristics) that identify the person, and an operator class of the person.

Figure 4:
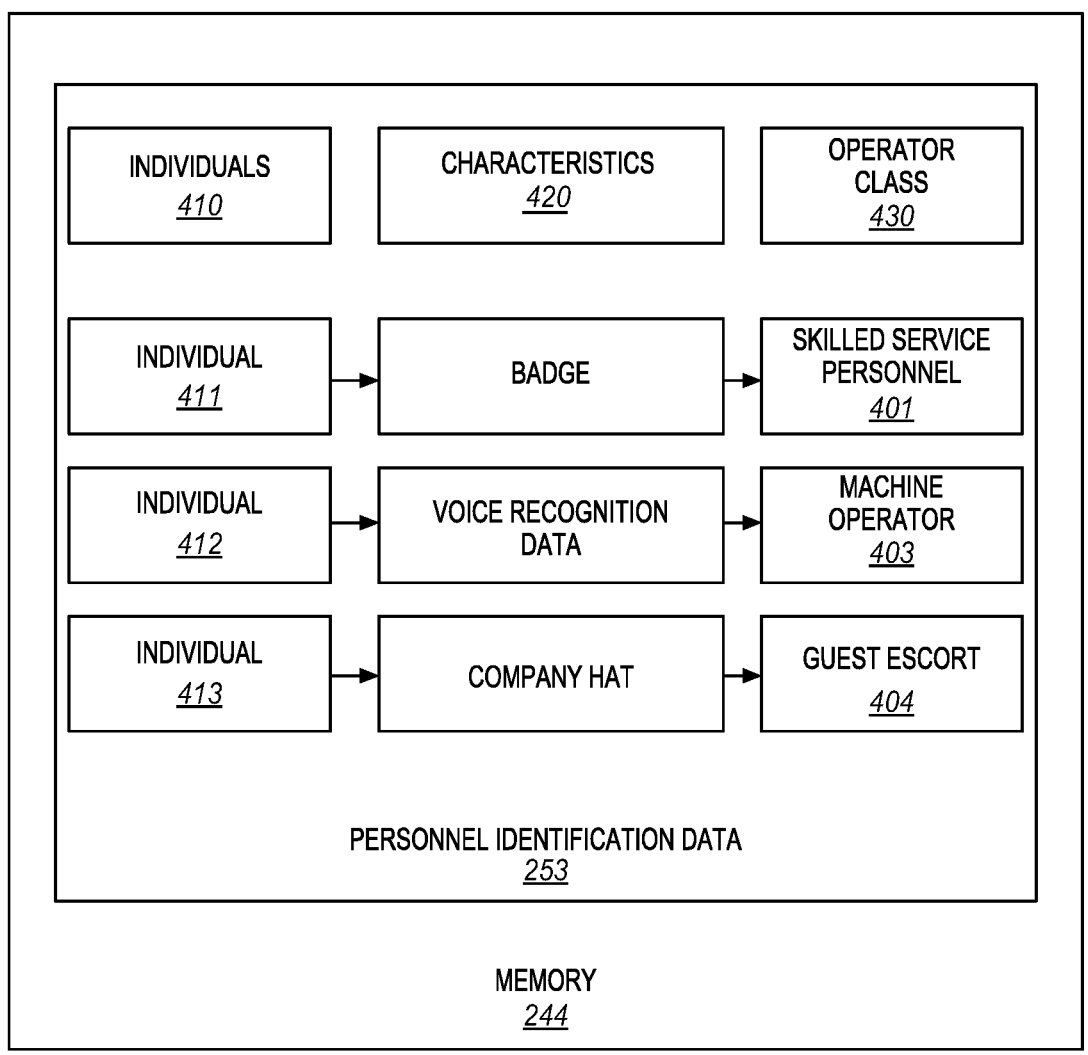
FIG. 4 is a block diagram of memory storing operator class data that correlates different operator classes with permitted actions in an illustrative embodiment.

FIG. 4 is a block diagram of memory 244 storing personnel identification data 253 that correlates individuals 410, characteristics 420 (e.g., identifiable badge, voice recognition data, hat, etc.), and an operator class 430. Individual 411 is skilled service personnel 401 and identifiable based on a badge specific to them. Individual 412 is a machine operator 403 and identifiable based on voice recognition data stored for that person. And, individual 413 is a guest escort 404 and identifiable based on a hat worn by the person.

Figure 5:
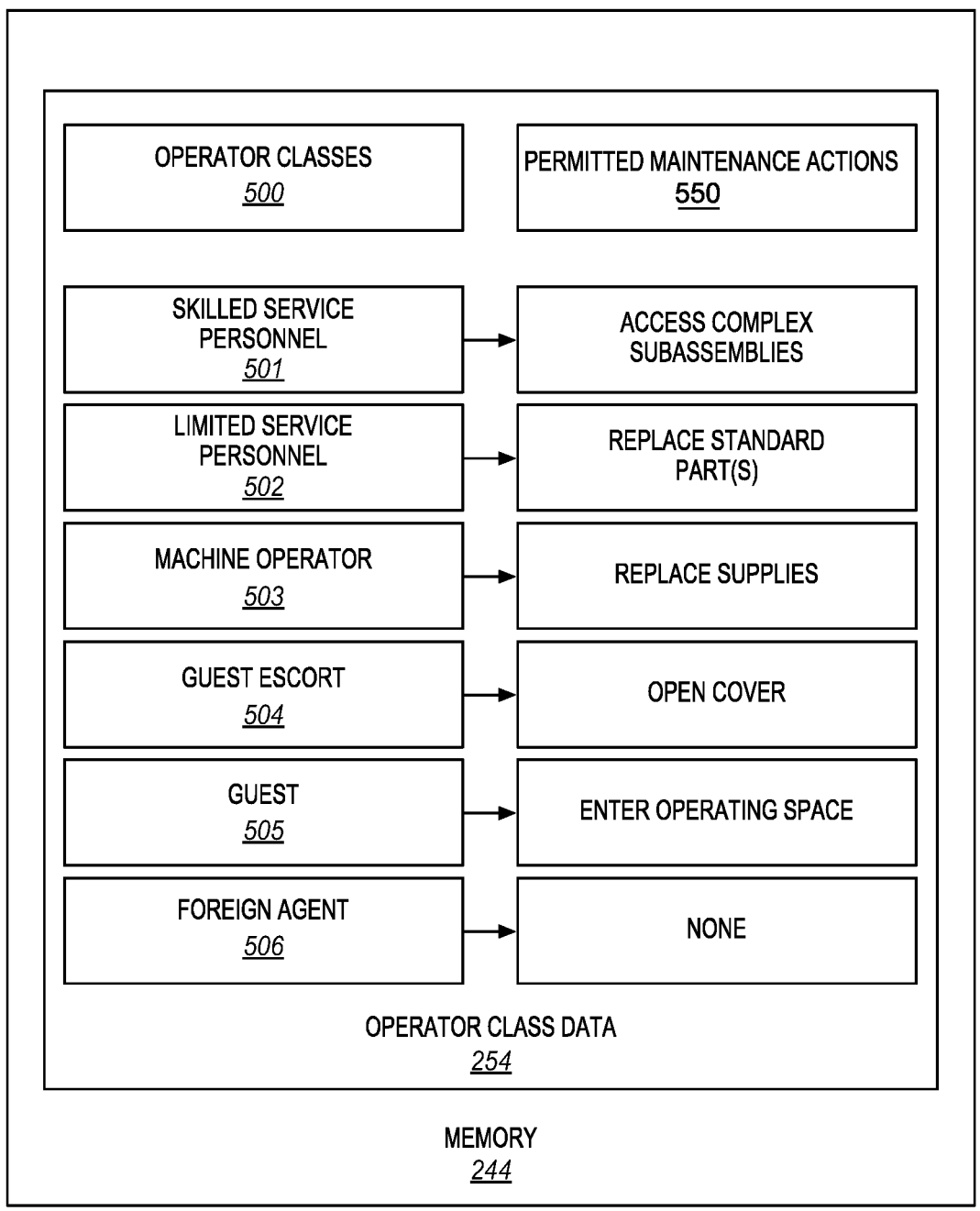
FIG. 5 is a block diagram of memory storing operator class data that correlates different operator classes with permitted actions in an illustrative embodiment.

FIG. 5 is a block diagram of memory 244 storing operator class data 254 that correlates different operator classes 500 with permitted maintenance actions 550 in an illustrative embodiment. Corresponding physical areas 216 may also be included in maintenance actions 550. Step 302 may alternatively or additionally include storing operator class data 254. The operator class data 254 may correlate each of the plurality of operator classes (e.g., operator classes 430), each of the plurality of physical areas of the printer (e.g., physical areas 216), and whether a maintenance action 550 is permissible. In this example, the operator classes 500 include skilled service personnel 501, limited service personnel 502, machine operator 503, guest escort 504, guest 505, and foreign agent 506. In particular, according to this example, skilled service personnel 501 is permitted to access complex subassemblies of the printer 110, limited service personnel 502 is permitted to replace a standard part of the printer 110, machine operator 503 is permitted to replace supplies (e.g., consumable printer supplies) of the printer 110, guest escort 504 is permitted to open a cover of the printer 110, guest 505 is permitted to be present in the operating space 170 of the printer 110, and foreign agent 506 is not permitted to be in the operating space 170 of the printer 110.

Returning to the method 300 of FIG. 3, in step 304, the intrusion detection controller 240 detects a presence of a person in the operating space 170 of the printer 110. For example, the intrusion detection controller 240 may monitor for persons entering a boundary around a perimeter of the printer 110 based on the camera image data 251. Alternatively or additionally, the intrusion detection controller 240 may obtain motion sensor data, RFID data, voice data, and/or perform pattern recognition to identify a person within the operating space 170 of the printer 110.

In step 306, the intrusion detection controller 240 analyzes the camera image data 251 of the person to detect one or more characteristics of the person. The characteristics (e.g., characteristics 420) of the person may include clothing features (e.g., color, type, badge, etc.) and/or features of an individual's body/face (e.g., hair color, height, eye color, etc.). The intrusion detection controller 240 may obtain motion sensor data or perform pattern recognition to identify characteristics of a person within an image.

In step 308, the intrusion detection controller 240 determines an operator class for the person based on a match of the characteristics with the personnel identification data 253. The intrusion detection controller 240 may compare a combination of patterns (e.g., video and/or audio obtained from within the operating space 170) with the stored personnel identification data 253. The patterns may be derived from historical data that the intrusion detection controller 240 previously obtained and stored as comparison reference information. The combination of patterns may include sequential information extracted over a time dimension and/or spatial dimension. Alternatively or additionally, the patterns may be combined into clusters and/or associated with labels and stored in memory. After initiating recognition of a person, the intrusion detection controller 240 may compare stored patterns and clusters against patterns of the person extracted at various levels, and calculate a probability or degree of matching for an operator class or object class. The intrusion detection controller 240 may select the operator class with the highest probability. Thus, the intrusion detection controller 240 may be configured to recognize operators based on a probabilistic model from extracted audio/video data and stored historical data.

In step 310, the intrusion detection controller 240 monitors adherence to maintenance permissions by the person in a plurality of physical areas of the printer based on the operator class of the person. For example, after determining which of the operator class levels 501-506 a person belongs, the intrusion detection controller 240 may reference operator class data 254 to determine which actions are permitted or not permitted for a particular area of the printer 110. Accordingly, the method 300 provides a benefit over prior techniques by restricting access to the printer 110 based on multiple operator classes.

Figure 6:
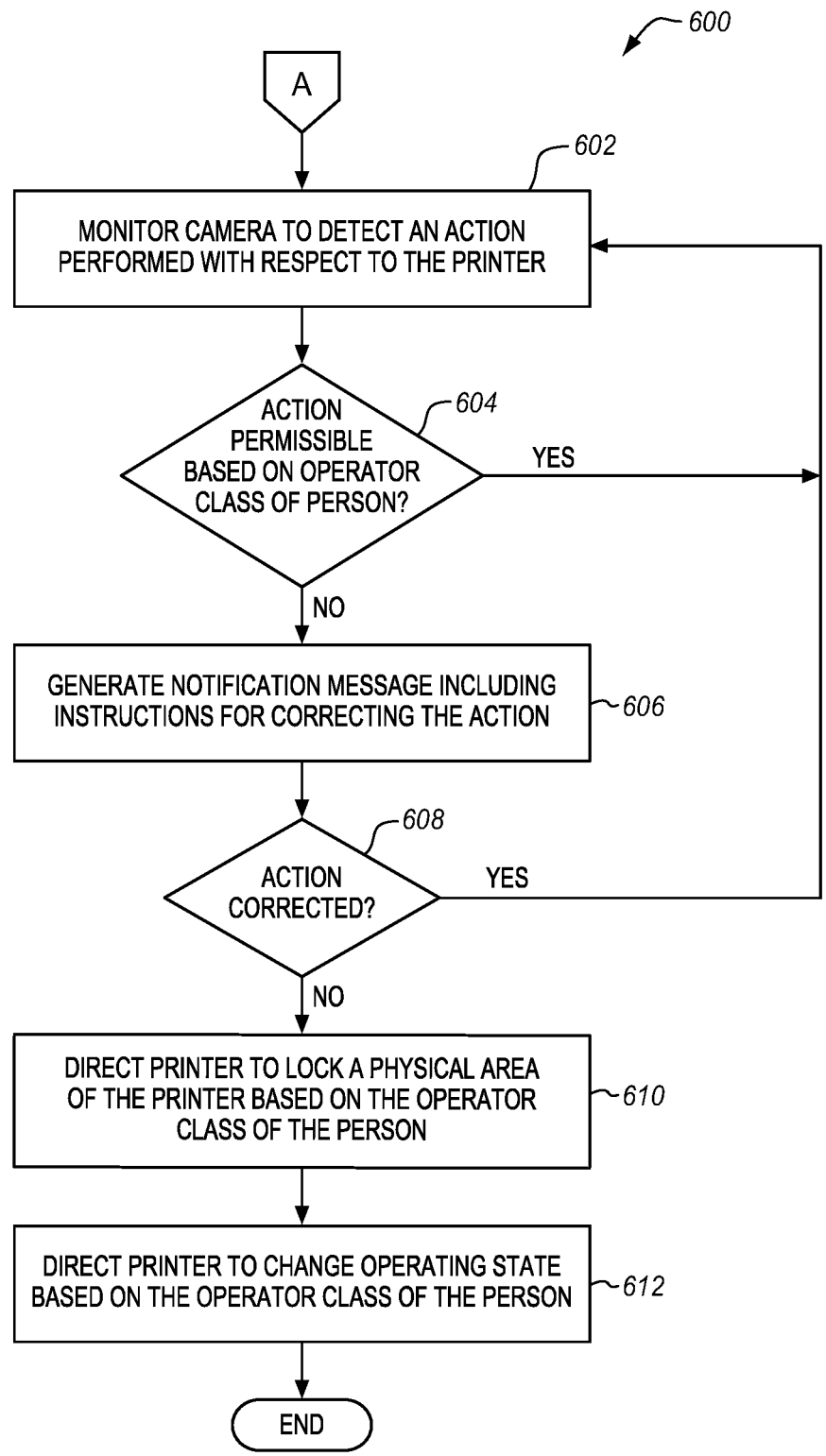
FIG. 6 is a flow chart illustrating a method of detecting intrusion of a printer in another illustrative embodiment.

FIG. 6 is a flow chart illustrating a method 600 of detecting intrusion of a printer in another illustrative embodiment. The steps of method 600 will be described with respect to the printer 110 of FIGS. 1-2, although one skilled in the art will understand that the method 600 may be performed by other systems not shown. The steps of the flow charts described herein are not all inclusive, may include other steps not shown, and may be performed in alternative orders.

In step 602, the intrusion detection controller 240 monitors the output of one or more of the cameras 161-162 to detect an action performed with respect to the printer 110. In step 604, the intrusion detection controller 240 determines whether the action is permissible based on an operator class of the person. If so, the printer 110 may continue operating as normal as the intrusion detection controller 240 continues to monitor for detected actions. Otherwise, the method 600 proceeds to step 606 and the intrusion detection controller 240 generates a notification message including instructions for correcting the action. In step 608, the intrusion detection controller 240 determines whether the actions have been corrected. If so, the printer 110 may continue operating as normal as the intrusion detection controller 240 continues to monitor for detected actions. Otherwise, the method 600 proceeds to step 610 and the intrusion detection controller 240 directs the printer 110 to lock a physical area of the printer based on an operator class of the person. For example, the intrusion detection controller 240 directs the printer 110 to lock a panel and/or subassembly of the printer 110.

In step 612, the intrusion detection controller 240 directs the printer 110 to change its operating state. For example, if an operator attempts to perform a maintenance action that is restricted for their operator class, the intrusion detection controller 240 may direct the printer 110 to enter a safe mode. Alternatively or additionally, the intrusion detection controller 240 may direct the printer 110 to enter a failsafe state that can be recovered by higher security level personnel (e.g., skilled service personnel 501) but not lower security level personnel.

Figure 7:
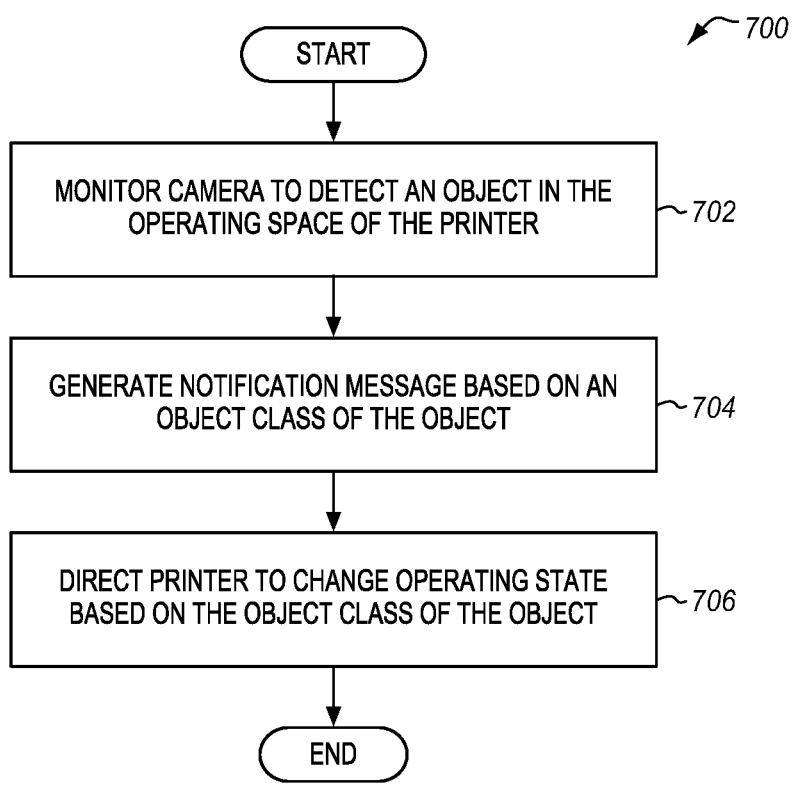
FIG. 7 is a flow chart illustrating a method of detecting intrusion of a printer in yet another illustrative embodiment.

FIG. 7 is a flow chart illustrating a method 700 of detecting intrusion of a printer in yet another illustrative embodiment. The steps of method 700 will be described with respect to the printer 110 of FIGS. 1-2, although one skilled in the art will understand that the method 700 may be performed by other systems not shown. The steps of the flow charts described herein are not all inclusive, may include other steps not shown, and may be performed in alternative orders.

In step 702, the intrusion detection controller 240 monitors the output of one or more of the cameras 161-162 to detect an object in the operating space 170 of the printer 110. After initiating recognition of an object, the intrusion detection controller 240 may compare stored patterns and clusters against patterns of the object (e.g., detected RFID label, barcode data, badge data, shape of the object image, etc.), and calculate a probability or degree of matching for an object class. Object classes may include transportation objects, print output, media/paper supplies, ink supplies, small supplies, small parts, large parts, service tools, packaging material, and restricted material. Similar as to operator personnel recognition previously described (e.g., whereby objects are represented in personnel identification data 253, objects correspond to operator class 430, and intrusion by the object is detected according to method 600), the intrusion detection controller 240 may select the object class with the highest probability or degree of matching. Thus, the intrusion detection controller 240 may be configured to recognize objects based on a probabilistic model from extracted video data and stored historical data.

In step 704, the intrusion detection controller 240 generates a notification message based on an object class of the object. And, in step 706, the intrusion detection controller 240 directs the printer 110 to change an operating state based on the object class of the object.

EXAMPLES

Figure 8:
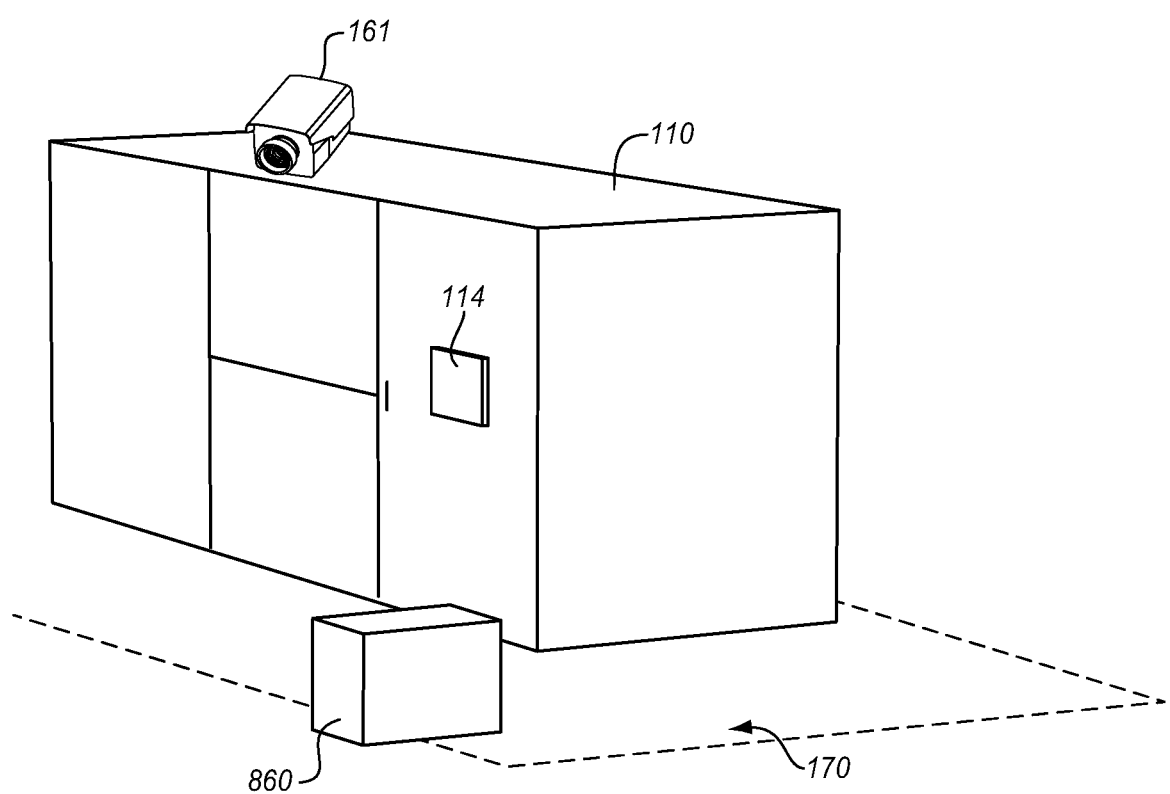
FIG. 8 shows the printer capable of detecting object intrusion in an illustrative embodiment.

FIG. 8 shows the printer 110 capable of detecting object intrusion in an illustrative embodiment. Suppose, for example, that the printer 110 receives a notification of an ink replacement order or has itself ordered replacement ink in response to detecting the supply of ink is low. Using a sensor or camera, the intrusion detection controller 240 may recognize an object 860 as delivered replacement ink. The intrusion detection controller 240 may generate a notification of the delivery, and initiate recognition of a print operator that arrives to change the ink container. After authorizing the print operator, the intrusion detection controller 240 allows the print operator to swap ink containers and perform an ink replacement routine. The intrusion detection controller 240 may also direct the printer 110 to change the ink replacement state.

Alternatively suppose, for example, that the object 860 is determined by the intrusion detection controller 240 to correspond with a restricted material object class. The intrusion detection controller 240 may detect that the object 860 is positioned within a restricted area (e.g., an action of the object 860) and generate an alert (e.g., audio and/or video) or notification to a machine operator to reposition the object 860. The intrusion detection controller 240 may direct the printer 110 to stop printing if the object 860 is not removed for a period of time (e.g., an action of the object 860) which may vary depending on object class.

Figure 9:
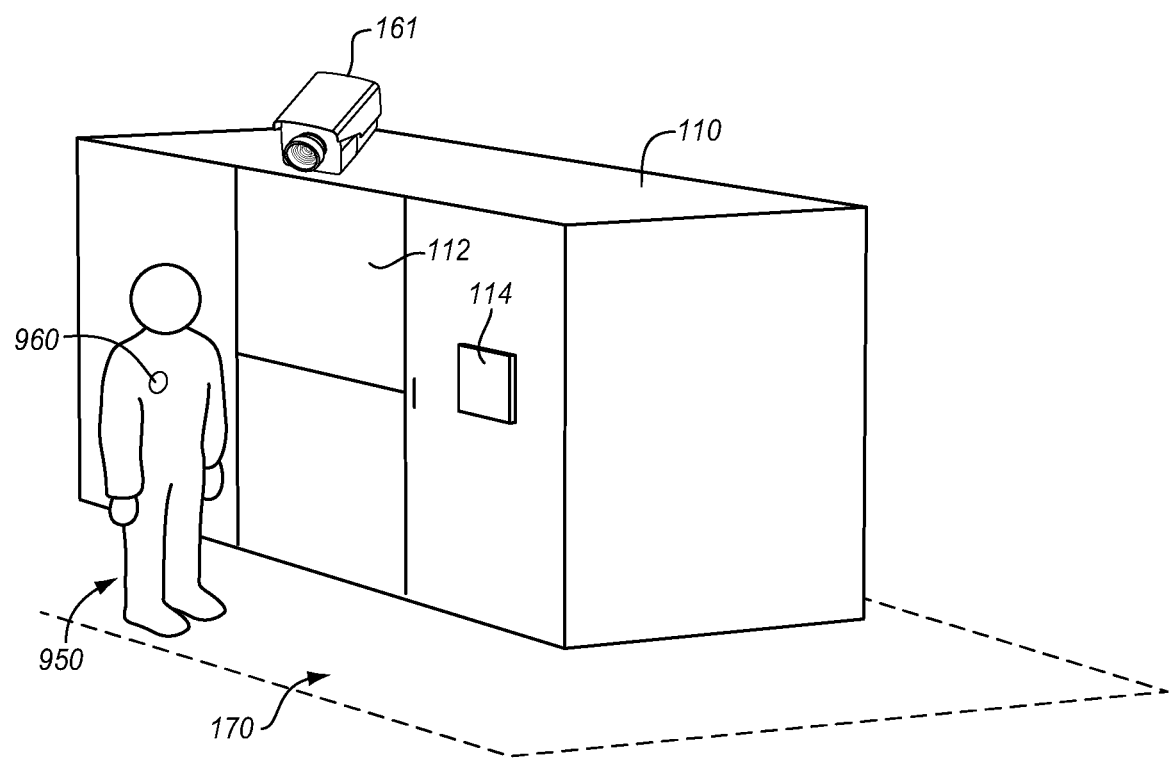
FIG. 9 shows the printer capable of detecting operator intrusion in an illustrative embodiment.

FIG. 9 shows the printer 110 capable of detecting operator intrusion in an illustrative embodiment. Suppose, for this example, that a person 950 arrives wearing a badge 960. Based on identification of the badge 960, the intrusion detection controller 240 may determine that the person 950 is a guest, and further that there is no guest escort present. In response, the intrusion detection controller 240 may alert a print operator of the arrival of the guest for corrective action. In response to detecting the guest has touched the printer 110, the intrusion detection controller 240 may issue another alert indicating a corrective action. If the guest continues touching the printer 110, the intrusion detection controller 240 may direct the printer 110 to stop printing and halt mechanical motion. In another example, if an authorized guest escort accompanies the person 950, the intrusion detection controller 240 may permit touching the printer 110 with the guest escort present in the operating space 170.

Figure 10:
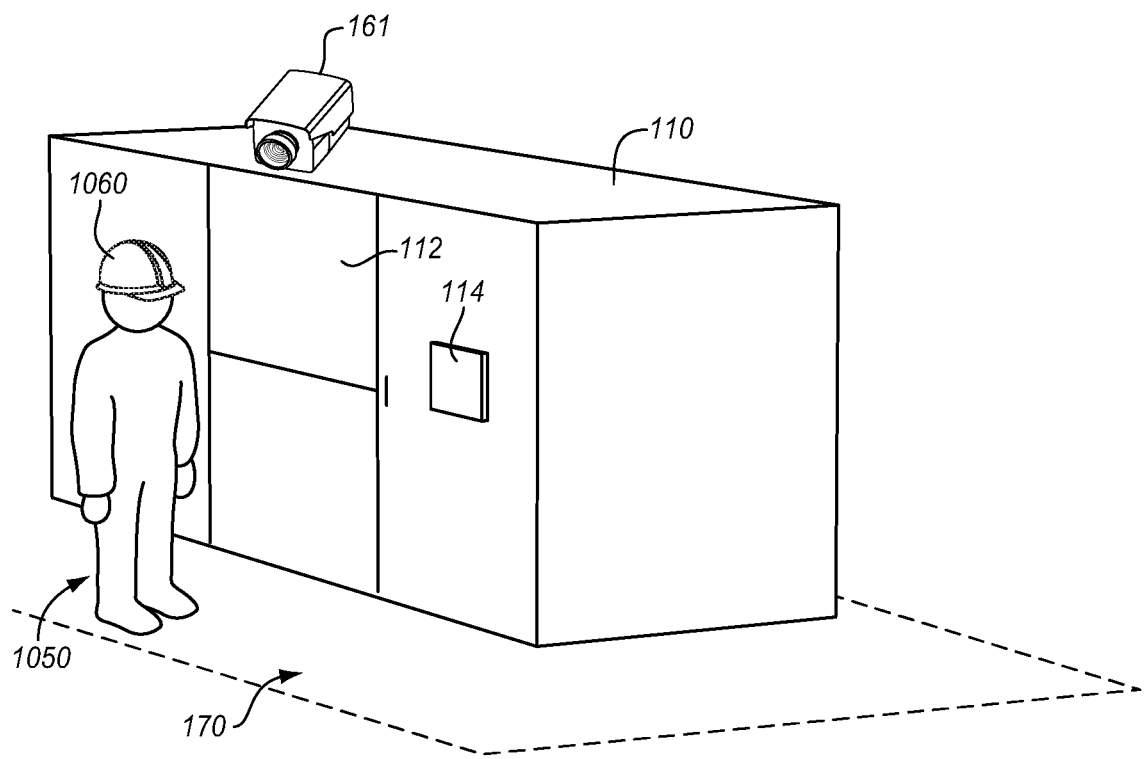
FIG. 10 shows the printer capable of interacting with a human operator in an illustrative embodiment.

FIG. 10 shows the printer 110 capable of interacting with a human operator in an illustrative embodiment. Suppose, for this example, the person 1050 intends to register with the printer 110 as a machine operator. The person 1050 enters the operating space 170 of the printer 110 and may be initially recognized as a guest permitted to move within the operating space 170 but restricted from physical interaction with the printer 110. To register as a machine operator, the person 1050 may position in front of console 1014 and face a monitor or camera (e.g., camera 161). The intrusion detection controller 240 may recognize the person 1050 as a machine operator based on facial recognition. Using the display of the console 1014, the intrusion detection controller 240 may instruct the person 1050 to wear an Augmented Reality (AR) headset 1060 and allow the person 1050 to perform procedures consistent with their class. The intrusion detection controller 240 may provide guidance to the person 1050 via the AR headset 1060 for performing maintenance functions on the printer 110.

Figure 11:
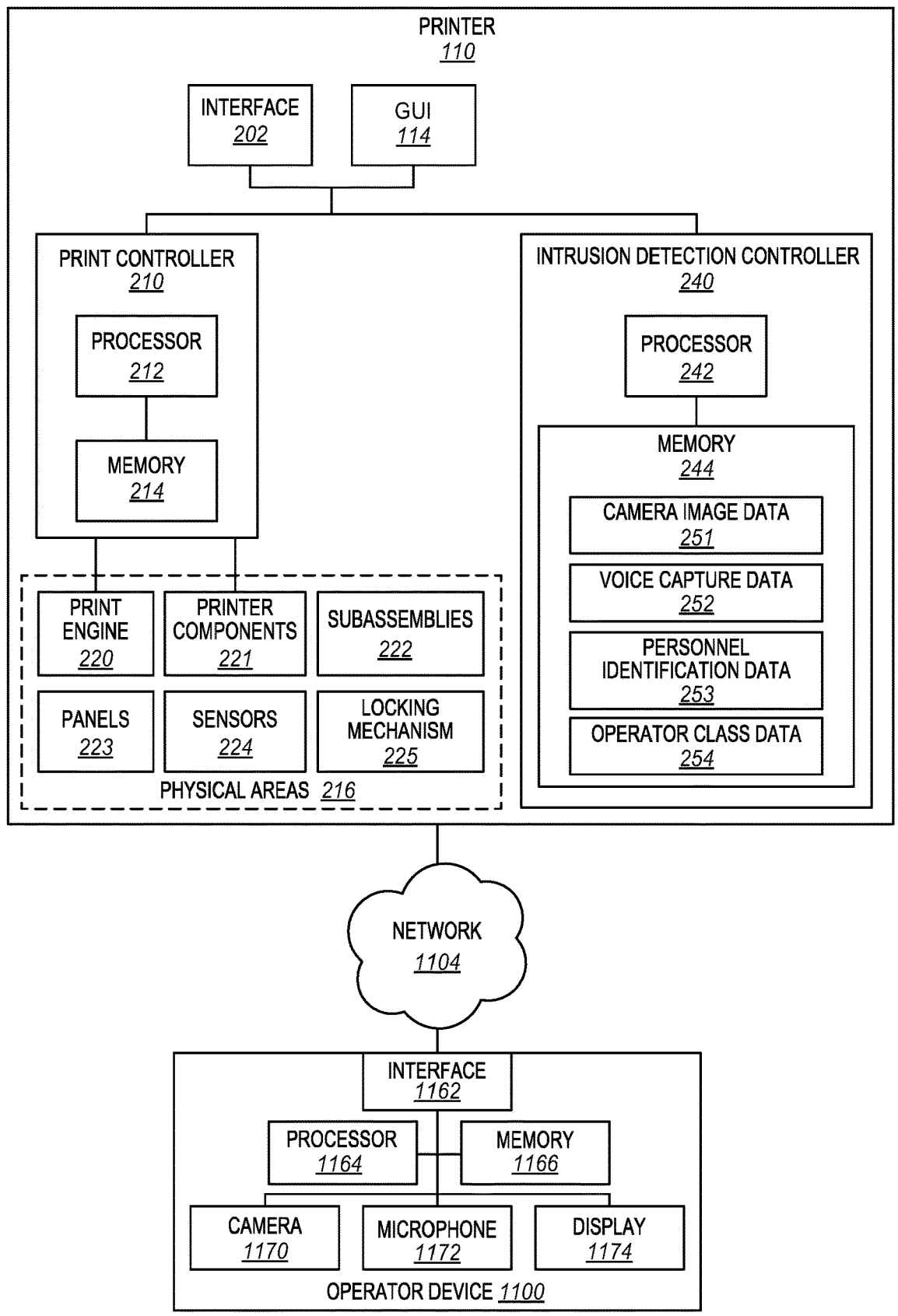
FIG. 11 is a block diagram of an operator device in communication with the printer in an illustrative embodiment.

FIG. 11 is a block diagram of an operator device 1100 in communication with the printer 110 in an illustrative embodiment. The operator device 1100 may include any system or device in communication with the printer 110 via network 1104 and configured to receive messages or instructions regarding maintenance or intrusion events of the printer 110. The operator device 1100 may include an interface 1162, a processor 1164, memory 1166, camera 1170, microphone 1172, and display 1174. In some embodiments, the operator device 1100 may include a wearable device (e.g., Augmented Reality headset 1060), and the printer 110 may transmit data image/audio to the display 1174 (e.g., transparent display) for view by a technician or operator. Alternatively or additionally, the printer 110 may transmit images or messages for viewing to a non-transparent display or display not worn by the human operator such as the GUI 114 of the printer 110.

Figure 12:
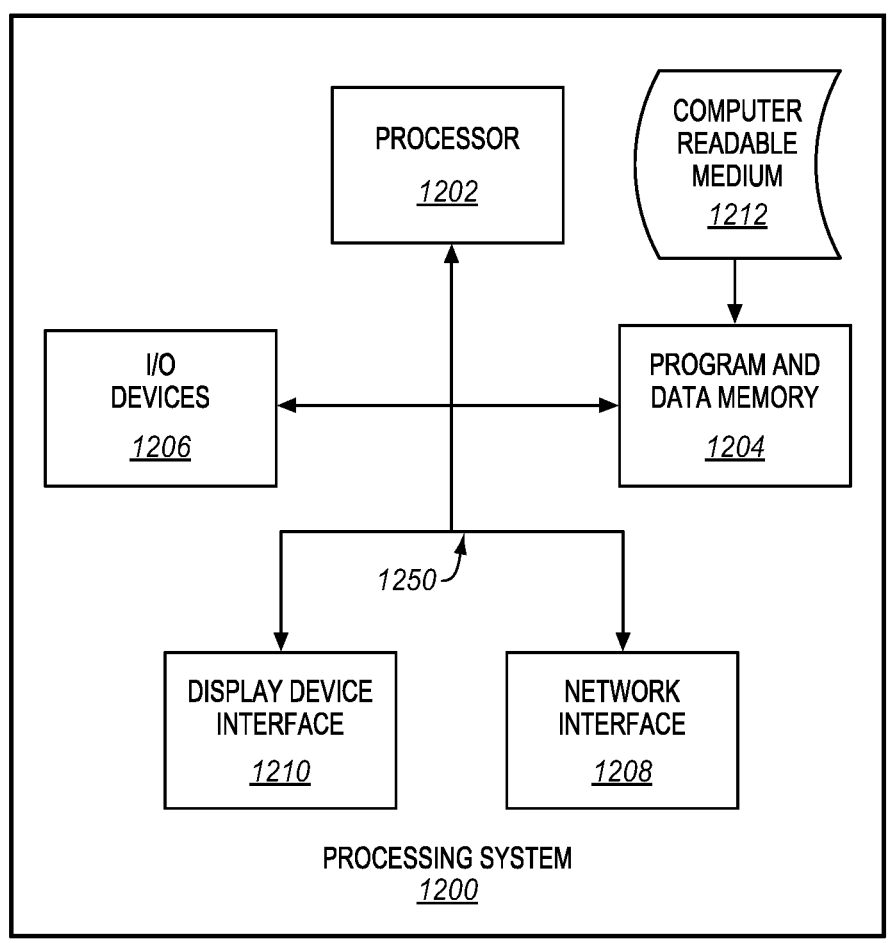
FIG. 12 illustrates a computer system operable to execute computer readable medium embodying programmed instructions to perform desired functions in an illustrative embodiment.

Embodiments disclosed herein can take the form of software, hardware, firmware, or various combinations thereof. In one particular embodiment, software is used to direct a processing system to perform the various operations disclosed herein. FIG. 12 illustrates a processing system 1200 operable to execute a computer readable medium embodying programmed instructions to perform desired functions in an illustrative embodiment. Processing system 1200 is operable to perform the above operations by executing programmed instructions tangibly embodied on computer-readable storage medium 1212. In this regard, embodiments of the invention can take the form of a computer program accessible via computer-readable medium 1212 providing program code for use by a computer or any other instruction execution system. For the purposes of this description, computer-readable storage medium 1212 can be anything that can contain or store the program for use by the computer.

Computer-readable storage medium 1212 can be an electronic, magnetic, optical, electromagnetic, infrared, or semiconductor device. Examples of computer-readable storage medium 1212 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1200, being suitable for storing and/or executing the program code, includes at least one processor 1202 coupled to program and data memory 1204 through a system bus 1250. Program and data memory 1204 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1206 (including but not limited to keyboards, displays, pointing devices, etc.) can be coupled either directly or through intervening I/O controllers. Network adapter interfaces 1208 may also be integrated with the system to enable processing system 1200 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1210 may be integrated with the system to interface to one or more display devices, such as printing systems and screens for presentation of data generated by processor 1202.

Although specific embodiments were described herein, the scope of the invention is not limited to those specific embodiments. The scope of the invention is defined by the following claims and any equivalents thereof.

What is claimed is:

1. A system comprising:
memory configured to store personnel identification data that correlates individuals with operator classes permitted to perform different levels of maintenance actions on a printer, and operator class data that correlates the operator classes with the maintenance actions permissible for a respective operator class and with physical areas of the printer where the maintenance actions are permissible; and
an intrusion detection controller configured to detect a presence of a person in an operating space of the printer based on image data, to analyze the image data to detect one or more characteristics of the person, to determine an operator class for the person based on a match of the detected characteristics of the person with the personnel identification data stored in the memory, and to monitor adherence to maintenance permissions by the person by determining which maintenance actions are permitted at the physical areas of the printer based on the operator class of the person and the operator class data.

2. The system of claim 1 wherein:
the intrusion detection controller is configured to detect a maintenance action of the person at a physical area of the printer, to determine whether the maintenance action is permitted at the physical area of the printer based on the operator class of the person, and in response to determining that the maintenance action is impermissible, to generate a notification including instructions for correcting the maintenance action.

3. The system of claim 1 wherein:
the different levels of maintenance actions include entering the operating space, touching the printer, opening a panel of the printer, and removing a component of the printer.

4. The system of claim 2 wherein:
the intrusion detection controller is configured to direct the printer to lock the physical area if the maintenance action is not corrected.

5. The system of claim 1 wherein:
the intrusion detection controller is configured to direct the printer to lock one or more panels of the printer to control access to at least one of the physical areas of the printer based on the operator class of the person.

6. The system of claim 1 wherein:
the characteristics of the person comprise a badge worn by the person; and
the intrusion detection controller is configured to determine the operator class for the person based on identification of the badge.

7. The system of claim 1 wherein:
the intrusion detection controller is configured to direct the printer to change an operating state of the printer based on the operator class of the person.

8. The system of claim 1 further comprising:
a camera having a field of view of the operating space of the printer.

9. The system of claim 1 further comprising:
the printer that occupies the operating space.

10. A method comprising:
storing, in memory, personnel identification data that correlates individuals with operator classes permitted to perform different levels of maintenance actions on a printer, and operator class data that correlates the operator classes with the maintenance actions permissible for a respective operator class and with physical areas of the printer where the maintenance actions are permissible;
detecting a presence of a person in an operating space of the printer based on image data;
analyzing the image data to detect one or more characteristics of the person;
determining an operator class for the person based on a match of the detected characteristics of the person with the personnel identification data stored in the memory; and
monitoring adherence to maintenance permissions by the person by determining which maintenance actions are permitted at the physical areas of the printer based on the operator class of the person and the operator class data.

11. The method of claim 10 further comprising:
detecting a maintenance action of the person at a physical area of the printer;
determining whether the maintenance action is permitted at the physical area of the printer based on the operator class of the person; and
in response to determining that the maintenance action is impermissible, generating a notification including instructions for correcting the maintenance action.

12. The method of claim 11 further comprising:
directing the printer to lock the physical area if the maintenance action is not corrected.

13. The method of claim 10 wherein:
the different levels of maintenance actions include entering the operating space, touching the printer, opening a panel of the printer, and removing a component of the printer.

14. The method of claim 10 further comprising:
directing the printer to lock one or more panels of the printer to control access to at least one of the physical areas of the printer based on the operator class of the person.

15. A non-transitory computer readable medium including programmed instructions which, when executed by a processor, are operable for performing a method, the method comprising:
storing, in memory, personnel identification data that correlates individuals with operator classes permitted to perform different levels of maintenance actions on a printer, and operator class data that correlates the operator classes with the maintenance actions permissible for a respective operator class and with physical areas of the printer where the maintenance actions are permissible;
detecting a presence of a person in an operating space of the printer based on image data;
analyzing the image data to detect one or more characteristics of the person;
determining an operator class for the person based on a match of the detected characteristics of the person with the personnel identification data stored in the memory; and
monitoring adherence to maintenance permissions by the person by determining which maintenance actions are permitted at the physical areas of the printer based on the operator class of the person and the operator class data.

16. The medium of claim 15 wherein the method further comprises:
   detecting a maintenance action of the person at a physical area of the printer;
   determining whether the maintenance action is permitted at the physical area of the printer based on the operator class of the person; and
   in response to determining that the maintenance action is impermissible, generating a notification including instructions for correcting the maintenance action.

17. The medium of claim 16 wherein the method further comprises:
   directing the printer to lock the physical area if the maintenance action is not corrected.

18. The medium claim 15 wherein:
   the different levels of maintenance actions include entering the operating space, touching the printer, opening a panel of the printer, and removing a component of the printer.

19. The medium claim 15 wherein the method further comprises:
   directing the printer to lock one or more panels of the printer to control access to at least one of the physical areas of the printer based on the operator class of the person.

20. The medium claim 15 wherein the method further comprises:
   directing the printer to change an operating state of the printer based on the operator class of the person.

* * * * *